US007593008B2

(12) United States Patent
Yamada

(10) Patent No.: US 7,593,008 B2
(45) Date of Patent: Sep. 22, 2009

(54) ELECTRO-OPTICAL APPARATUS, DRIVING METHOD THEREOF, AND ELECTRONIC DEVICE

(75) Inventor: Tadashi Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/153,762

(22) Filed: May 23, 2008

(65) Prior Publication Data

US 2008/0297540 A1 Dec. 4, 2008

Related U.S. Application Data

(60) Continuation of application No. 11/338,819, filed on Jan. 25, 2006, now Pat. No. 7,394,442, which is a division of application No. 10/353,975, filed on Jan. 30, 2003, now Pat. No. 7,123,221.

(30) Foreign Application Priority Data

Feb. 1, 2002 (JP) ............................ 2002-026129
Jan. 30, 2003 (JP) ............................ 2003-022020

(51) Int. Cl.
*G06F 3/038* (2006.01)
*G09G 5/00* (2006.01)

(52) U.S. Cl. ........................................ 345/204; 345/77

(58) Field of Classification Search ............. 345/76-78, 345/88-89, 107, 204, 690

See application file for complete search history.

(56) References Cited

U.S. PATENT DOCUMENTS

| | | | |
|---|---|---|---|
| 4,975,692 | A | 12/1990 | Tateyama |
| 5,027,036 | A | 6/1991 | Ikarashi et al. |
| 5,920,301 | A | 7/1999 | Sakamoto et al. |
| 6,249,279 | B1 | 6/2001 | Shirasawa |
| 6,271,825 | B1 | 8/2001 | Greene et al. |
| 6,411,306 | B1 | 6/2002 | Miller et al. |
| 6,603,450 | B1 | 8/2003 | Yamazaki et al. |
| 6,784,862 | B2 | 8/2004 | Kodate et al. |

FOREIGN PATENT DOCUMENTS

| | | |
|---|---|---|
| JP | A-10-254410 | 9/1998 |
| JP | A-11-109918 | 4/1999 |
| JP | A-11-154596 | 6/1999 |
| JP | A-11-161218 | 6/1999 |
| JP | A-11-214157 | 6/1999 |
| JP | A-11-233256 | 8/1999 |
| JP | A-2000-56730 | 2/2000 |
| JP | A-2000-91083 | 3/2000 |
| JP | A-2000-115802 | 4/2000 |
| JP | A-2000-122598 | 4/2000 |
| JP | A-2000-132139 | 5/2000 |
| JP | A-2000-322022 | 11/2000 |
| JP | A-2001-13903 | 1/2001 |
| JP | A-2001-56670 | 2/2001 |
| JP | A-2001-296830 | 10/2001 |
| JP | A-2002-6796 | 1/2002 |
| JP | A-2002-287688 | 10/2002 |
| WO | WO98/40871 | 9/1998 |

*Primary Examiner*—Ricardo L Osorio
(74) *Attorney, Agent, or Firm*—Oliff & Berridge, PLC

(57) ABSTRACT

An electrooptical apparatus having a plurality of scanning lines, a plurality of signal lines, and electrooptical devices each being placed at an intersection of each of the scanning lines and each of the signal lines, and the electrooptical apparatus is driven according to the amount of drive current supplied to the electrooptical devices. The electrooptical apparatus includes a lighting time measuring unit for measuring a lighting time of the electrooptical devices, a lighting time storage unit for storing the lighting time obtained by the lighting time measuring unit, and a drive current amount adjusting unit for adjusting the amount of drive current based on the lighting time stored in the lighting time storage unit so as to correct the brightness of the electrooptical devices.

6 Claims, 12 Drawing Sheets

(a)

(b)

DRIVE VOLTAGE CONTROL CIRCUIT 70

(a)

(b)

DATA CORRECTION CIRCUIT 80

ELECTRO-OPTICAL APPARATUS, DRIVING METHOD THEREOF, AND ELECTRONIC DEVICE

This is a Continuation of application Ser. No. 11/338,819 filed Jan. 25, 2006 which is a Division of application Ser. No. 10/353,975 filed Jan. 30, 2003. The entire disclosure of the prior application, is hereby incorporated by reference herein in its entirety.

BACKGROUND OF THE INVENTION

1. Field of Invention

The present invention relates to an electro-optical apparatus, a driving method thereof, and an electronic device.

2. Description of Related Art

In related art organic EL display apparatuses, for example, the degradation of the luminous brightness of organic EL devices of the organic EL display apparatuses over time is much more rapid than that of inorganic EL display apparatuses. That is, as the lighting time accumulates, the reduction in brightness becomes noticeable. As an example, in the organic EL display apparatuses, the lighting time with a luminance of, for example, 300 cd/$m^2$ is up to approximately 10,000 hours.

Accordingly, this drawback can be addressed or overcome by enhancing the manufacturing process so that the reduction in brightness is prevented, as disclosed in Japanese Unexamined Patent Application Publication No. 11-154596, and Japanese Unexamined Patent Application Publication No. 11-214157.

SUMMARY OF THE INVENTION

In reality, however, with the approach of enhancing the manufacturing process, it is difficult to completely prevent the reduction in brightness. The present invention addresses or overcomes this and/or other problems, and provides a technique for compensating for a change in brightness over time by use of an approach involving circuit technology.

The present invention provides a first electro-optical apparatus having a plurality of electro-optical devices, whose brightness is defined according to the amount of drive power supplied to the plurality of electro-optical devices. The electro-optical apparatus includes a lighting time measuring unit to measure a lighting time of the electro-optical devices; a lighting time storage unit to store the lighting time measured by the lighting time measuring unit; and a drive power amount adjusting unit to adjust the amount of drive power based on the lighting time stored in the lighting time storage unit.

The present invention also provides a second electro-optical apparatus having a plurality of scanning lines, a plurality of signal lines, and electro-optical devices placed at intersections of the plurality of scanning lines and the plurality of signal lines, whose brightness is defined according to data signals supplied via the plurality of signal lines. The electro-optical apparatus includes a data signal measuring unit to measure the amount of data signals supplied via the plurality of signal lines; a data signal amount storage unit to store the data signal measured by the data signal measuring unit; and a drive power amount adjusting unit to adjust the amount of drive power based on the amount of data signals stored in the data signal amount storage unit.

In the above-described electro-optical apparatus, the electro-optical devices may include three types of electro-optical devices for R, G, and B (red, green, and blue); the data signal amount measuring unit may measure the amount of data signals for each of the three types of electro-optical devices; the data signal amount storage unit may store the amount of data signals for each of the three types of electro-optical devices measured by the data signal amount measuring unit; and the drive current amount adjusting unit may adjust the amount of drive power based on the amount of data signals stored for each of the three types of electro-optical devices in the data signal storage unit.

In the above-noted electro-optical apparatus, specifically, the drive power amount adjusting unit may be, for example, a data correction circuit to modify digital data or analog data according to the accumulated lighting time or the accumulated amount of data signals, or a drive voltage control circuit to adjust a drive voltage applied to the electro-optical devices. The drive power amount adjusting unit may also be a circuit to generate a reference voltage of a DAC to generate analog data supplied to the electro-optical devices.

An electronic device of the present invention includes the above-noted electro-optical apparatus.

The present invention also provides a first driving method of an electro-optical apparatus having an electro-optical device. The driving method includes: measuring a lighting time of the electro-optical device; storing the measured lighting time; and adjusting the amount of drive power supplied to the electro-optical device based on the stored lighting time.

The present invention also provides a second driving method of an electro-optical apparatus having a plurality of scanning lines, a plurality of signal lines, and electro-optical devices each being placed at an intersection of each of the scanning lines and each of the signal lines, the electro-optical apparatus being driven according to the amount of drive power and image data supplied to the electro-optical devices. The driving method includes: measuring the amount of image data supplied to the electro-optical devices; storing the measured amount of image data; and adjusting the amount of drive power based on the stored amount of image data.

In the above-noted driving method, the amount of image data may be measured for each of three colors, R, G, and B (red, green, and blue); the amount of image data measured for each of R, G, and B may be stored, and the amount of drive power may be adjusted based on the stored amount of image data for each of R, G, and B.

In the present invention, pixel colors are not limited to three colors, R, G, and B (red, green, and blue), and any other color may be used.

Other features of the present invention will become apparent from the accompanying drawings and the following description.

DETAILED DESCRIPTION OF PREFERRED EMBODIMENTS

An exemplary embodiment of the present invention is described below. In this exemplary embodiment, an electro-optical apparatus implemented as a display apparatus (hereinafter "an organic EL display apparatus") which employs organic electroluminescent devices (hereinafter "organic EL devices"), and a driving method thereof are described, by way of example.

First, the organic EL display apparatus is briefly described. As is well known in the art, an organic EL panel constituting the organic EL display apparatus is formed of a matrix of unit pixels including organic EL devices. The circuit structure and operation of the unit pixels are such that, for example, as described in a book titled "ELECTRONIC DISPLAYS" (Shoichi Matsumoto, published by Ohmsha on Jun. 20, 1996) (mainly, page 137), a drive current is supplied to each of the unit pixels to write a predetermined voltage to an analog memory formed of two transistors and a capacitor so as to control lighting (illumination) of the organic EL devices.

In the exemplary embodiments according to the present invention, the lighting time of the organic EL display apparatus is directly or indirectly measured to adjust the value of a current supplied to the organic EL devices according to the accumulated lighting time.

First Exemplary Embodiment

In the first exemplary embodiment, a frame synchronizing signal FCLK described below is counted in order to measure the accumulated lighting time of the organic EL display apparatus.

Figure 1:
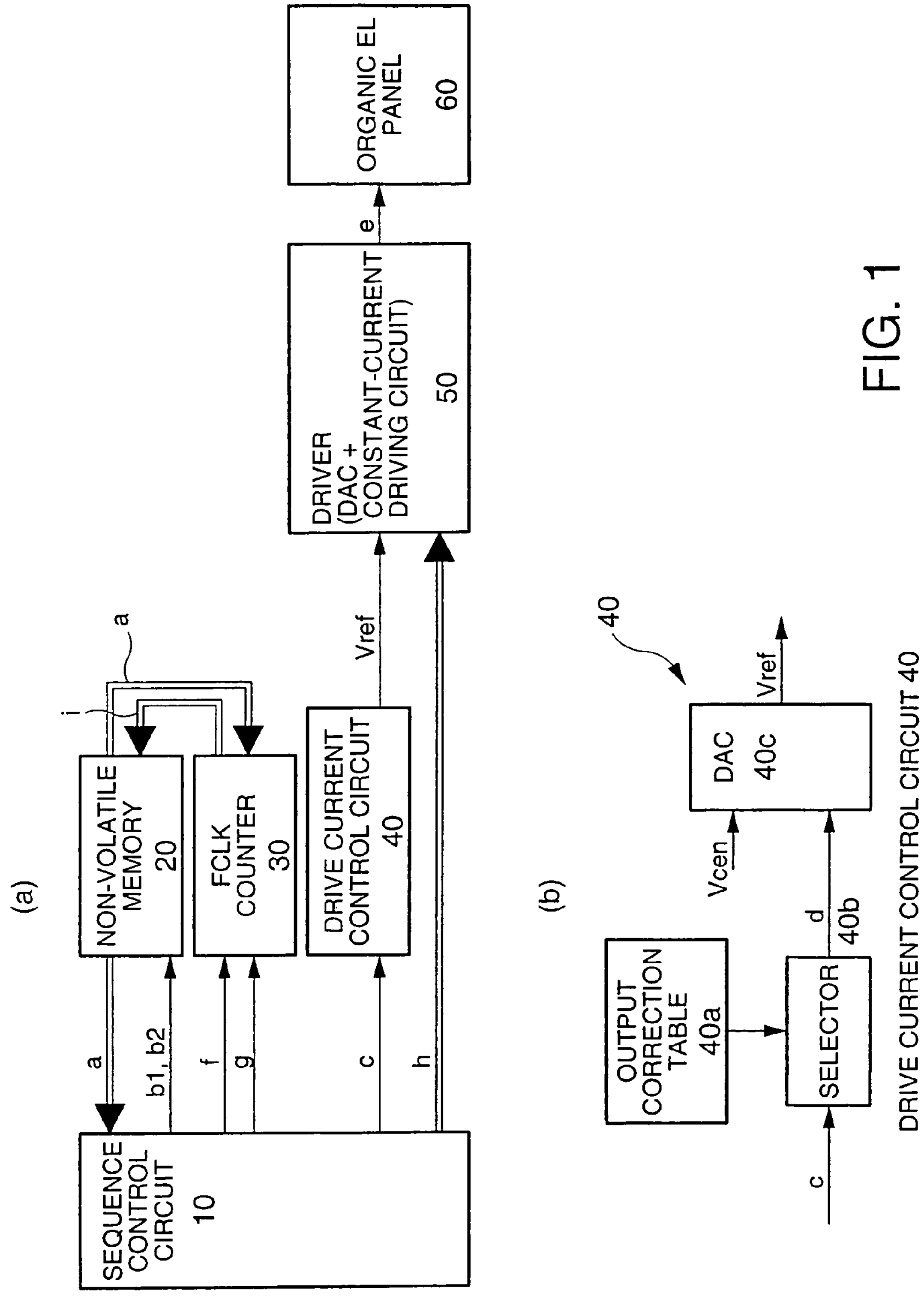
FIGS. 1(*a*) and 1(*b*) are schematics of an organic EL display apparatus according to a first exemplary embodiment of the present invention, where FIG. 1(*a*) is a schematic of the control of the overall apparatus, and FIG. 1(*b*) is a schematic of the control of a drive current control circuit 40.

Specifically, as shown in FIG. 1(*a*), the organic EL display apparatus according to the first exemplary embodiment includes a sequence control circuit 10, a non-volatile memory 20, such as a flash memory, an FCLK counter 30, a drive current control circuit 40, a driver 50 formed of a well-known DAC (D/A converter) and a constant-current driving circuit, and an organic EL panel 60. As shown in FIG. 1(*b*), the drive current control circuit 40 includes an output correction table 40*a*, a selector 40*b*, and a DAC (D/A converter) 40*c*.

The operation of the sequence control circuit 10 is described below. As shown in the schematics of FIGS. 1(*a*) and 1(*b*), the sequence control circuit 10 reads an accumulated lighting time a stored in the non-volatile memory 20 (this operation corresponds to step S10 in the flowchart of FIG. 2). Typically, the accumulated lighting time a is preferably the time starting from initial use immediately after shipment of the apparatus. The sequence control circuit 10 outputs a readout signal b1, which is "H", to the non-volatile memory 20 to enable readout of the accumulated lighting time a.

Then, the sequence control circuit 10 outputs a select signal c corresponding to the accumulated lighting time a to the drive current control circuit 40. The selector 40*b* receives the select signal c from the sequence control circuit 10, and outputs a signal d to the DAC 40*c* with reference to the output correction table 40*a* in order to adjust the brightness based on the accumulated lighting time. In response to the output signal d, based on a central voltage Vcen, the DAC 40*c* outputs a reference voltage Vref, which becomes the central voltage of the DAC included in the driver 50, to the driver 50 (this operation corresponds to step S20 shown in FIG. 2). Preferably, the central voltage Vcen is preset at the manufacturing or shipment time of the apparatus.

Figure 2:
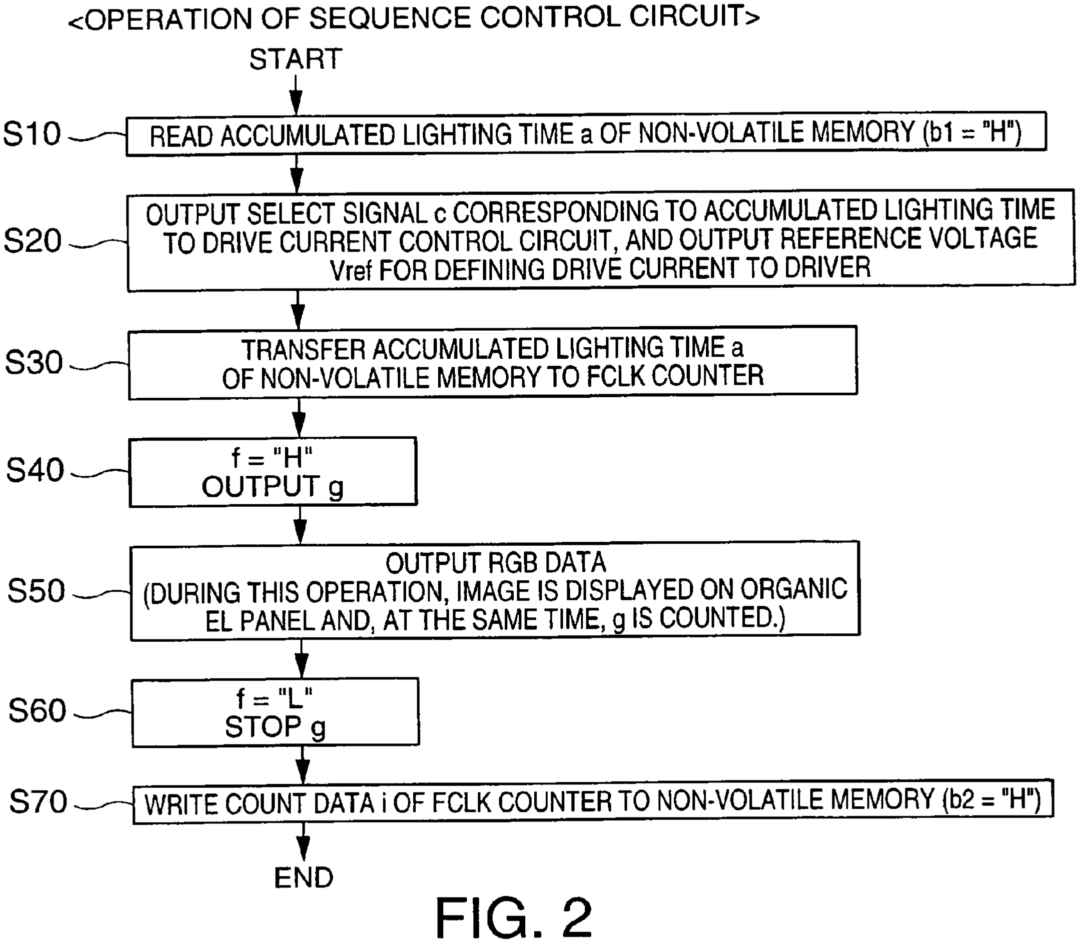
FIG. 2 is a flowchart showing the operation of a sequence control circuit 10 of the organic EL display apparatus according to the first exemplary embodiment of the present invention.

Then, the sequence control circuit 10 transfers the accumulated lighting time a of the non-volatile memory 20 to the FCLK counter 30 (this operation corresponds to step S30 shown in FIG. 2), before outputting a display-enable signal (f="H") and a frame synchronizing signal g to the FCLK counter 30 (this operation corresponds to step S40 shown in FIG. 2). Then, the sequence control circuit 10 is designed such that digital data h for Red, Green, and Blue (hereinafter "RGB data") are input from the sequence control circuit 10 to the DAC included in the driver 50 (this operation corresponds to step S50 shown in FIG. 2). The digital data h is subjected to digital-to-analog conversion in the driver 50 based on at least the above-described reference voltage Vref, which is obtained based on the accumulated lighting time a, immediately after supply of the digital data h starts, and analog data e corresponding to the digital data h is supplied to the organic EL panel 60. That is, if the same digital data is input to the driver 50, the analog data e which has been corrected based on the accumulated lighting time a is supplied to the organic EL panel 60. The analog data e may be either a voltage signal or a current signal.

During output of the digital data h, the predetermined analog data e is supplied to the organic EL panel 60 via the driver 50 to display an image on the organic EL panel 60, and the frame synchronizing signal g is counted by the FCLK counter 30. The FCLK counter 30 adds the count value of the frame synchronizing signal g to the previously read accumulated lighting time a to generate count data i.

Then, the sequence control circuit 10 stops outputting the RGB data so that the organic EL panel 60 is made to enter a non-display state, thus outputting a display-disable signal (f="L") to the FCLK counter 30, and also stops outputting the frame synchronizing signal g (this operation corresponds to step S60 shown in FIG. 2). Thus, counting of the frame synchronizing signal g terminates. Then, the count data i obtained by the FCLK counter 30 is written to the non-volatile memory 20 (this operation corresponds to step S70 shown in FIG. 2). The sequence control circuit 10 outputs a non-volatile memory writing signal b2, which is "H", to the non-volatile memory 20 to enable writing of the count data i. The written count data i serves as a new accumulated lighting time a.

The sequence control circuit 10, the FCLK counter 30, the output correction table 40*a*, the selector 40*b*, and the DAC 40*c* can be implemented by software or hardware, as required. The driver 50 can be implemented by either a current driving circuit or a voltage driving circuit.

Figure 3:
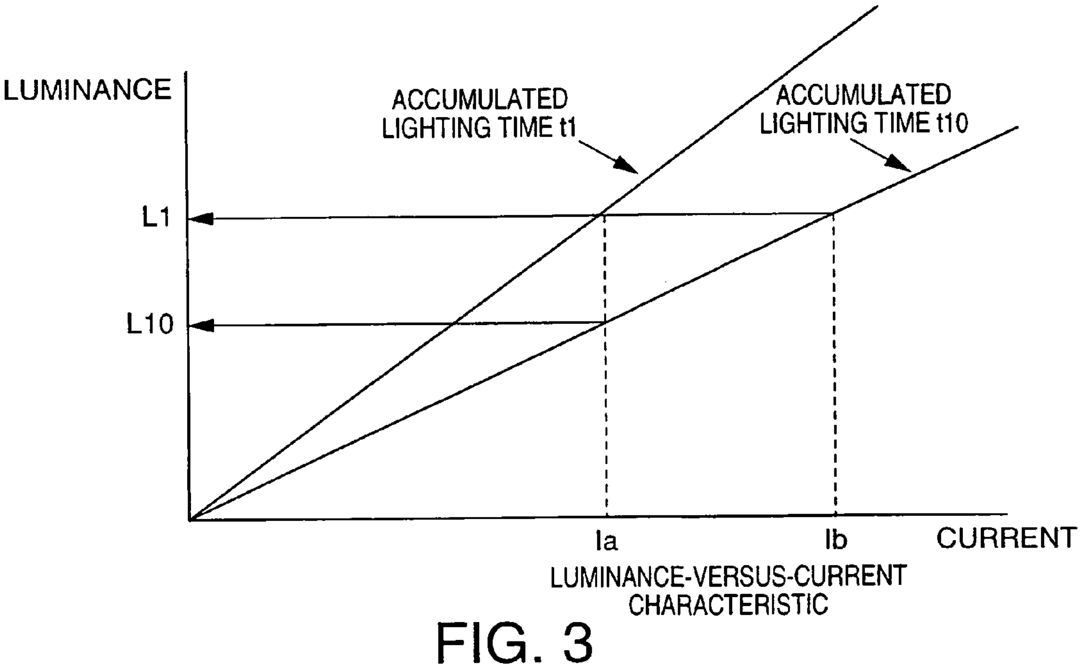
FIG. 3 is a graph of luminance with respect to the driver drive current in the organic EL display apparatus according to an exemplary embodiment of the present invention.

A brightness correcting method according to the present invention is described below in the context that the analog data e represents a current signal. FIG. 3 is a characteristic graph of the brightness with respect to the driver driving current supplied to the organic EL panel 60. In FIG. 3, the characteristic graph showing accumulated lighting time t1 at initial use exhibits luminance L1 with respect to current level Ia. However, the characteristic graph showing accumulated lighting time t10, where the characteristic changes due to degradation over time, exhibits luminance L10 with respect to the same current level Ia, resulting in lower luminance than that of the accumulated lighting time t1. Thus, in order to obtain a luminance equivalent to luminance L1 in the graph of the accumulated lighting time t1 at initial use, the current level is corrected based on the above-described accumulated lighting time a and output correction table 40*a* shown in FIG. 1 to obtain a resulting value Ib.

Second Exemplary Embodiment

In the second exemplary embodiment, the total sum of image data described below is counted to estimate the accumulated luminance of the organic EL display apparatus, thereby defining the central voltage of the DAC included in the driver 50. Other portions than this portion are common to those in the aforementioned first embodiment, and therefore the difference therebetween is primarily described below.

Figure 4:
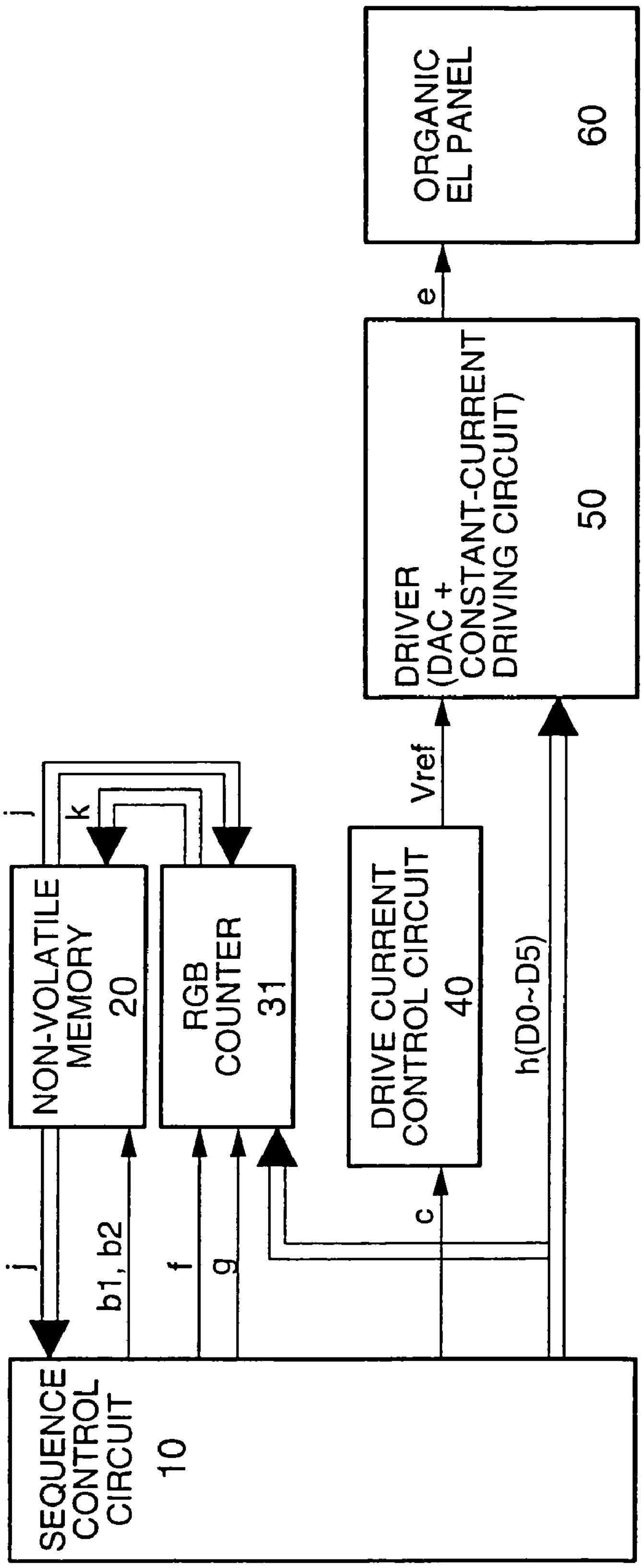
FIG. 4 is a schematic of the control of an organic EL display apparatus according to a second exemplary embodiment of the present invention.

Specifically, as shown in FIG. 4, the organic EL display apparatus according to the second exemplary embodiment includes an RGB counter 31 in place of the FCLK counter 30 shown in FIGS. 1(*a*) and 1(*b*). The RGB counter 31 may measure, as the accumulated luminance, the amount of data for at least one of R, G, and B types of electro-optical devices. In the second exemplary embodiment, the RGB counter 31 measures, as the accumulated luminance, the amount of data for all R, G, and B.

The operation of the sequence control circuit is described below. As shown in the schematic of FIG. 4, the sequence control circuit 10 reads accumulated luminance j stored in the non-volatile memory 20 (this operation corresponds to step S10 in the flowchart of FIG. 5). The sequence control circuit 10 outputs a readout signal b1, which is "H", to the non-volatile memory 20 to enable readout of the accumulated luminance j. Then, the sequence control circuit 10 outputs a select signal c corresponding to the accumulated luminance j to the drive current control circuit 40. The drive current control circuit 40 has a similar structure to that shown in FIG. 1(*b*). The selector 40*b* receives the select signal c from the sequence control circuit 10, and outputs a predetermined signal to the DAC 40*c* with reference to the output correction table 40*a* in order to adjust the brightness based on the accumulated luminance. In response to this output signal, the DAC 40*c* outputs a reference voltage Vref obtained based on a central voltage Vcen to the driver 50 (this operation corresponds to step S20 shown in FIG. 5).

Figure 5:
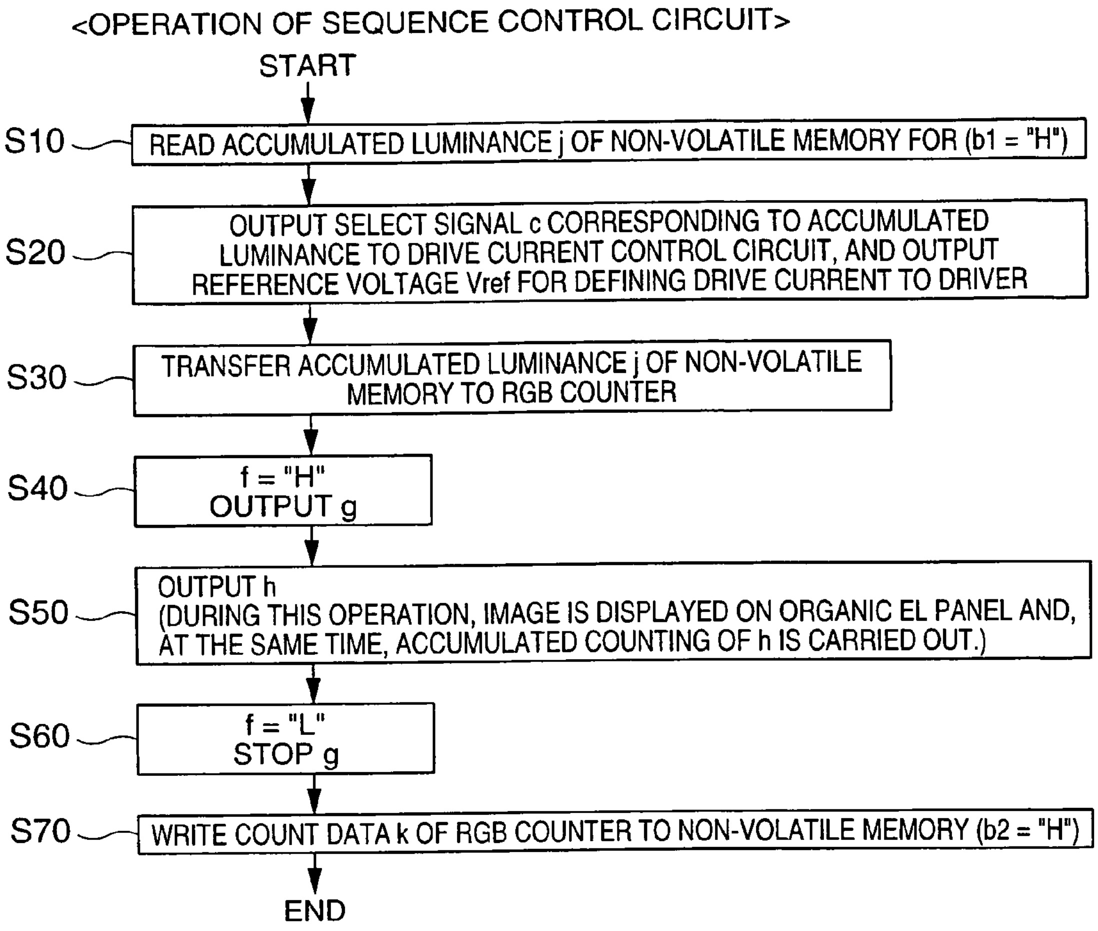
FIG. 5 is a flowchart showing the operation of a sequence control circuit 10 of the organic EL display apparatus according to the second exemplary embodiment of the present invention.

Then, the sequence control circuit 10 transfers the accumulated luminance j of the non-volatile memory 20 to the RGB counter 31 (this operation corresponds to step S30 shown in FIG. 5), before outputting a display-enable signal (f="H") and a frame synchronizing signal g (for example, a synchronization clock to transfer one pixel data rather than a clock for each frame) to the RGB counter 31 (this operation corresponds to step S40 shown in FIG. 5). Then, the sequence control circuit 10 supplies digital data (hereinafter referred to as RGB data) h for R, G, and B to the driver 50, and also outputs it to the RGB counter 31 (this operation corresponds to step S50 shown in FIG. 5). During output of the RGB data h, the RGB data h is converted into analog data e by the driver 50 based on the reference voltage Vref defined for the accumulated luminance j, and the analog data e is supplied to the organic EL panel 60.

After supply of the RGB data h starts, the total sum of the RGB data h is counted by the RGB counter 31. The RGB counter 31 adds the count value of the total sum of each RGB data h to the previously read accumulated luminance j to generate count data k.

Then, the sequence control circuit 10 stops outputting the RGB data h so that the organic EL panel 60 is made to enter a non-display state, thus outputting a display-disable signal (f="L") to the RGB counter 31, and also stops outputting the frame synchronizing signal g (this operation corresponds to step S60 shown in FIG. 5). Thus, counting of the total sum of the RGB data h terminates. Then, the count data k obtained by the RGB counter 31 is written to the non-volatile memory 20 (this operation corresponds to step S70 shown in FIG. 5). The sequence control circuit 10 outputs a non-volatile memory writing signal b2, which is "H", to the non-volatile memory 20 to enable writing of the count data k. The written count data k serves as a new accumulated luminance j.

The sequence control circuit 10, the RGB counter 31, the output correction table 40*a*, the selector 40*b*, and the DAC 40*c* can be implemented by software or hardware, as required. The driver 50 can be implemented by either a current driving circuit or a voltage driving circuit. A brightness correcting method according to the second exemplary embodiment is similar to that described above in the first exemplary embodiment.

Third Exemplary Embodiment

In the third exemplary embodiment, image data described below is counted for each of R, G, and B to estimate an accumulated luminance of the organic EL display apparatus. This allows accurate estimation of the accumulated luminance. Other portions than this portion are common to those in the above-described second embodiment, and therefore the difference therebetween is primarily described below.

Figure 6:
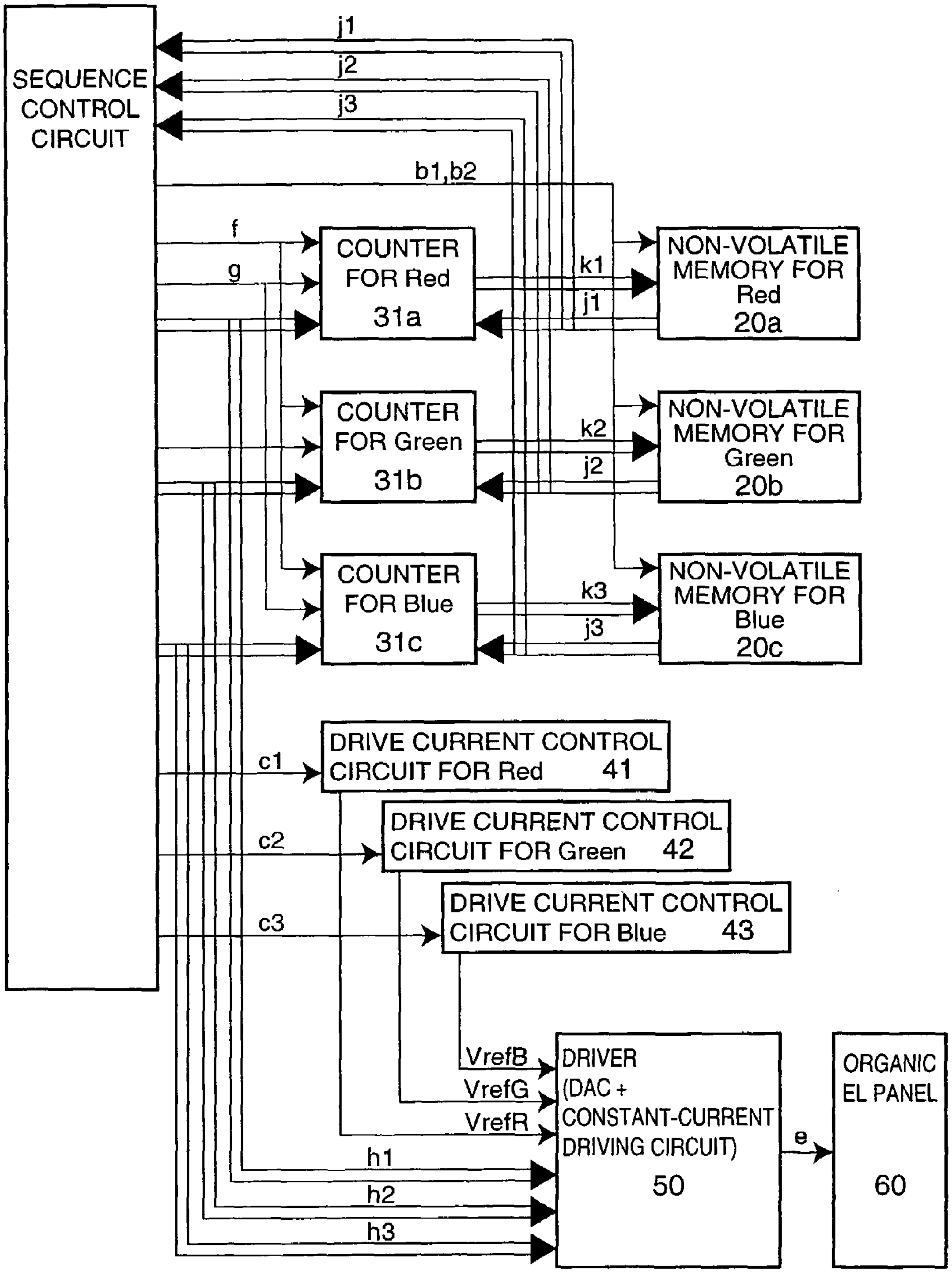
FIG. 6 is a schematic of the control of an organic EL display apparatus according to a third exemplary embodiment of the present invention.

Specifically, as shown in FIG. 6, in the organic EL display apparatus of the third exemplary embodiment, the non-volatile memory 20 shown in FIG. 4 is formed of a non-volatile memory 20*a* for R, a non-volatile memory 20*b* for G, and a non-volatile memory 20*c* for B, and the RGB counter 31 shown in FIG. 4 is formed of a counter 31*a* for R, a counter 31*b* for G, and a counter 31*c* for B. Furthermore, the drive current control circuit 40 shown in FIG. 4 is formed of a circuit 41 for R, a circuit 42 for G, and a circuit 43 for B.

The operation of the sequence control circuit is described below. As shown in the schematic of FIG. 6, the sequence control circuit 10 reads accumulated luminances j1 for R, j2 for G, and j3 for B stored in the non-volatile memories 20*a*, 20*b*, and 20*c*, respectively (this operation corresponds to step S10 in the flowchart of FIG. 7). The sequence control circuit 10 outputs a readout signal b1, which is "H", to the non-volatile memory 20 to enable readout of the accumulated luminances j1 for R, j2 for G, and j3 for B. Then, the sequence control circuit 10 outputs select signals c1, c2, and c3 corresponding to the accumulated luminances j1, j2, and j3, respectively, to the drive current control circuits 41, 42, and 43, respectively. Each of the drive current control circuits 41, 42, and 43 has a similar structure to that shown in FIG. 1(*b*). The selectors 40*b* of the drive current control circuits 41, 42, and 43 receive the respective select signals c1, c2, and c3 from the sequence control circuit 10, and output predetermined signals to the DACs 40*c* with reference to the output correction tables 40*a* in order to adjust the brightness based on the accumulated luminances for R, G, and B. In response to the output signals, the DACs 40*c* output to the driver 50 reference voltages VrefR, VrefG, and VrefB obtained for R, G, and B based on a central voltage Vcen (this operation corresponds to step S20 shown in FIG. 7).

Figure 7:
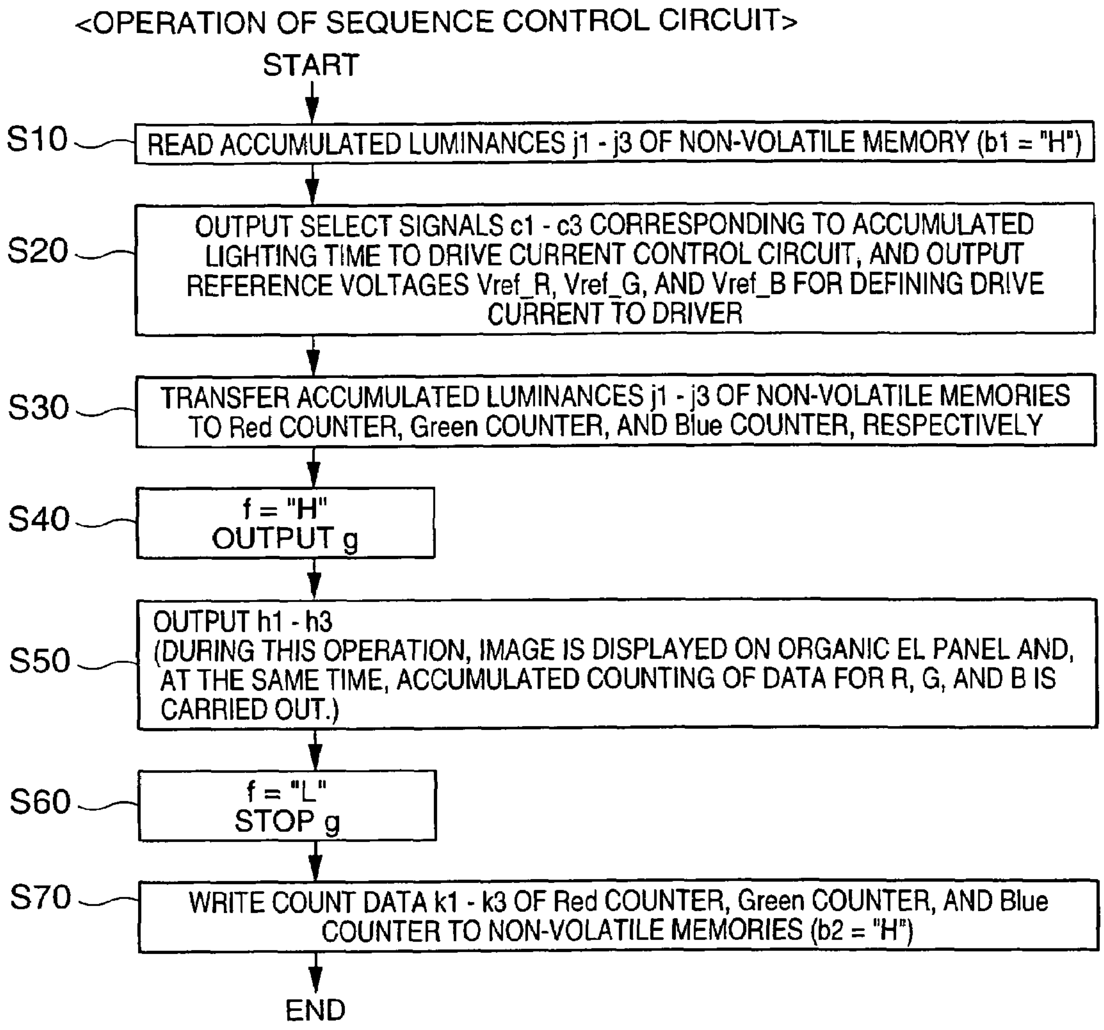
FIG. 7 is a flowchart showing the operation of a sequence control circuit 10 of the organic EL display apparatus according to the third exemplary embodiment of the present invention.

Then, the sequence control circuit 10 transfers the accumulated luminances a1, a2, and a3 of the non-volatile memories 20*a*, 20*b*, and 20*c* to the RGB counters 31*a*, 31*b*, and 31*c*, respectively (this operation corresponds to step S30 shown in FIG. 7), before outputting a display-enable signal (f="H") and a frame synchronizing signal g (in this exemplary embodiment, a synchronization clock to transfer one pixel data rather than a clock for each frame) to each of the R, G, and B counters 31*a*, 31*b*, and 31*c* (this operation corresponds to step S40 shown in FIG. 7). Then, the sequence control circuit 10 outputs to the driver 50 image data (hereinafter "RGB data") h1, h2, and h3 for Red, Green, and Blue, and also outputs them to the R, G, and B counters 31*a*, 31*b*, and 31*c*, respectively (this operation corresponds to step S50 shown in FIG. 7).

In a period in which the RGB data h1, h2, and h3 are output to the driver 50, according to the above-noted process, the DAC included in the driver 50 converts the R data h1, the G data h2, and the B data h3 into analog data e based on the reference voltage Vref obtained for each of R, G, and B, and supplies the analog data e to the organic EL panel 60. An image is displayed on the organic EL panel 60, and the RGB data are counted in each of the R, G, and B counters 31*a*, 31*b*, and 31*c*. The R, G, and B counters 31*a*, 31*b*, and 31*c* add the count values of the R, G, and B data h1, h2, and h3 to the previously read R, G, and B accumulated luminances j1, j2, and j3 to generate count data k1, k2, and k3 for R, G, and B, respectively.

The sequence control circuit 10 stops outputting the RGB data h1, h2, and h3 so that the organic EL panel 60 is made to enter a non-display state, thus outputting a display-disable signal (f="L") to the RGB counter 31, and also stops outputting the frame synchronizing signal g (this operation corresponds to step S60 shown in FIG. 7). Thus, counting of the RGB data h1, h2, and h3 terminates. Then, the count data k1, k2, and k3 for R, G, and B obtained by the RGB counters 31*a*, 31*b*, and 31*c*, respectively, are written to the non-volatile memory 20 (this operation corresponds to step S70 shown in FIG. 7). The sequence control circuit 10 outputs a non-volatile memory writing signal b2, which is "H", to the non-volatile memory 20 to enable writing of the count data k1, k2, and k3. The written count data k1, k2, and k3 serve as new accumulated luminances j1, j2, and j3.

The sequence control circuit 10, the Red counter 31*a*, the Green counter 31*b*, the Blue counter 31*c*, the output correction tables 40*a*, the selectors 40*b*, and the DACs 40*c* can be implemented by software or hardware, as required. The driver 50 can be implemented by either a current driving circuit or a voltage driving circuit.

Figure 8:
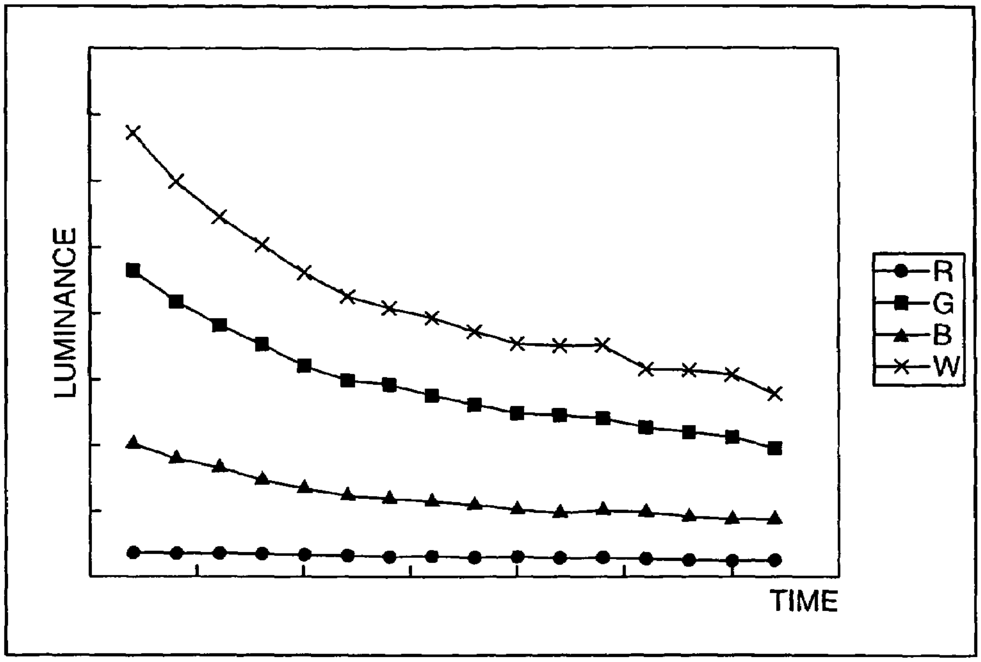
FIG. 8 is a luminance life characteristic graph of an organic EL display apparatus of the related art.
Figure 9:
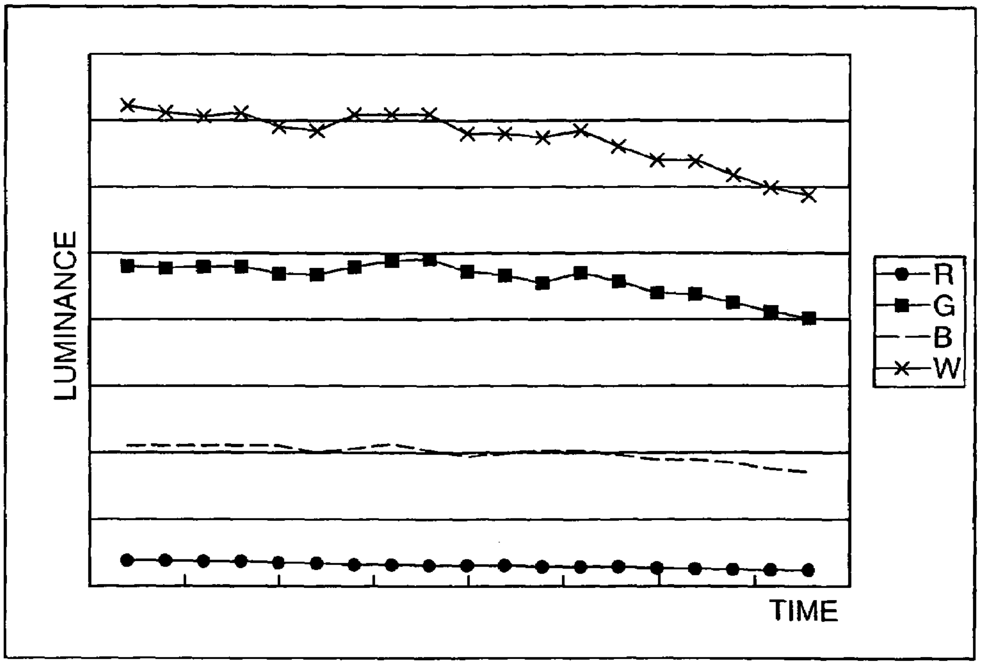
FIG. 9 is a luminance life characteristic graph of an organic EL display apparatus according to an exemplary embodiment of the present invention.

The advantage of brightness correction according to the third exemplary embodiment is described below with reference to luminance life characteristic graphs of FIGS. 8 and 9. In FIGS. 8 and 9, the luminance indicates a luminance of predetermined RGB data which is input to the driver 50.

As depicted in the graph of FIG. 8, in a typical organic EL display apparatus which is not subjected to brightness correction, when all R, G, and B pixels are illuminated, the luminance for W (white), G, and B is reduced over time by approximately 50% compared to the early stages of use. In the present exemplary embodiment, however, as depicted in FIG. 9, the reduction in brightness can be greatly suppressed. In particular, the luminance for white is reduced only by approximately 20%. The same advantage applies to both the above-described first and second exemplary embodiments.

In the foregoing description of Exemplary Embodiments 1 through 3, the reference voltage Vref supplied to the DAC included in the driver is adjusted to adjust the brightness; however, this is merely an example. Various modifications in design may be made, if necessary, including adjustment of the power supply voltage applied to the organic EL devices and modification of data.

Figure 10:
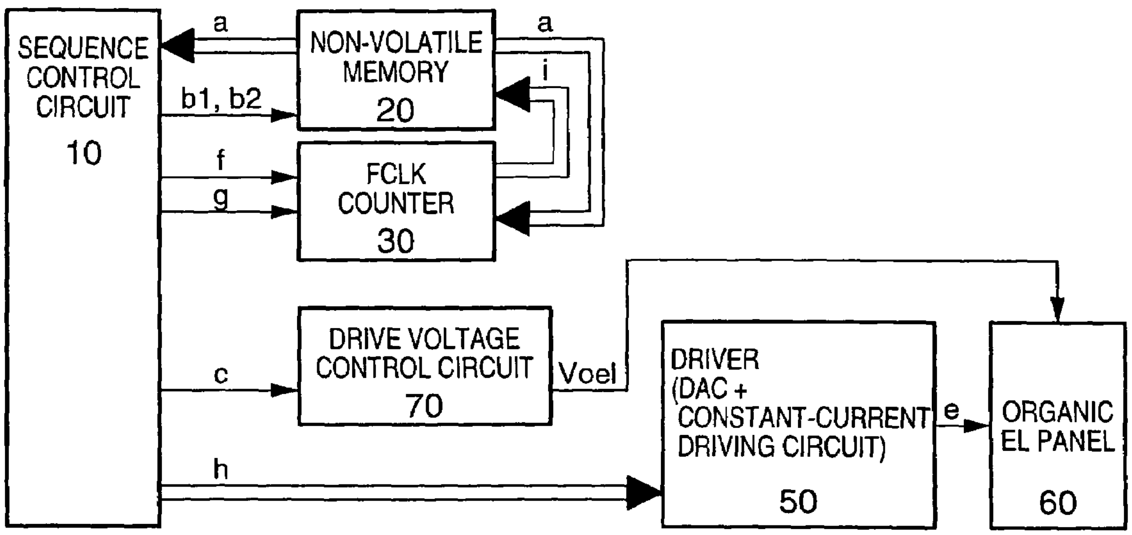
FIGS. 10(*a*) and 10(*b*) are schematics of an organic EL display apparatus according to a first application of the present invention, where FIG. 10(*a*) is a schematic of the control of the overall apparatus, and FIG. 10(*b*) is a schematic of the control of a drive voltage control circuit 70.
Figure 10:
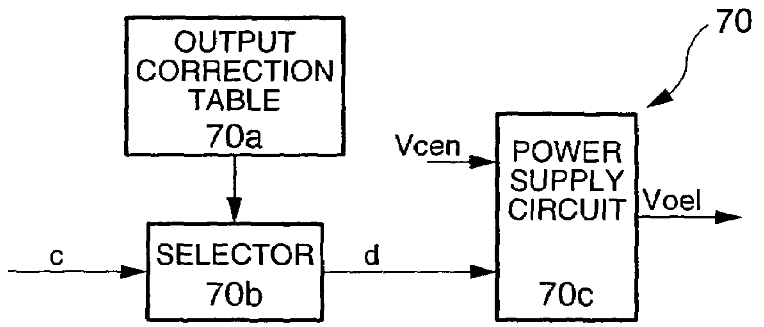

As an example, as shown in FIGS. 10(*a*) and 10(*b*), a drive voltage Voel may be defined according to the accumulated lighting time a. In this case, a select signal c is input to a selector 70*b* of a drive voltage control circuit 70, and the selector 70*b* refers to an output correction table 70*a* and outputs a signal d to a power supply circuit 70*c* having a DAC function. The drive voltage Voel is defined based on the signal d, and the drive voltage Voel is output from the power supply circuit 70*c* to the organic EL panel 60.

Figure 11:
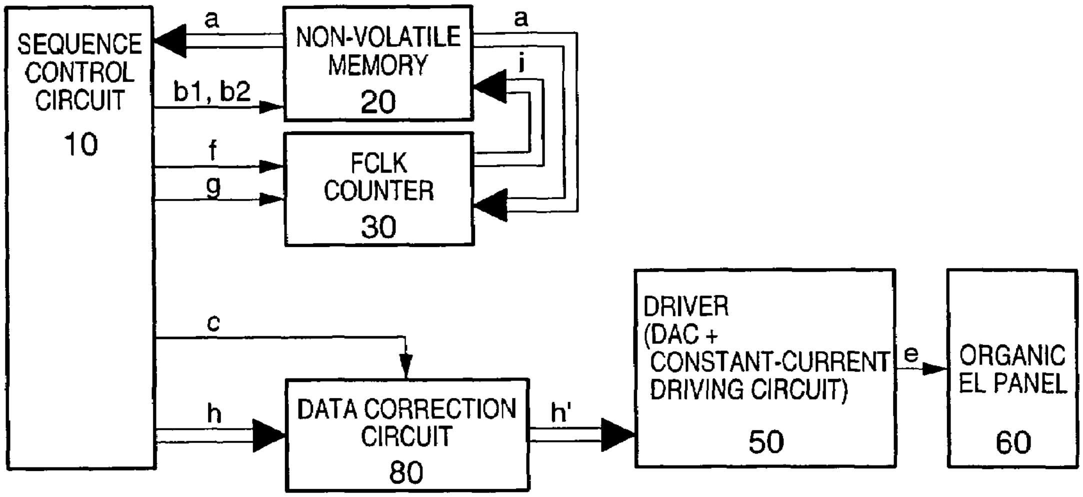
FIGS. 11(*a*) and 11(*b*) are schematics of an organic EL display apparatus according to a second application of the present invention, where FIG. 11(*a*) is a schematic of the control of the overall apparatus, and FIG. 11(*b*) is a schematic of the control of a data correction circuit 80.
Figure 11:
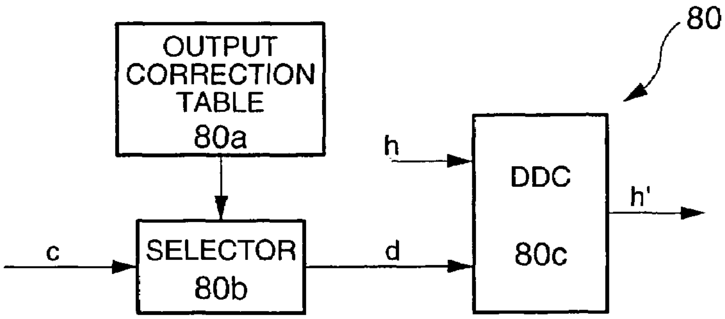

As another example, as shown in FIGS. 11(*a*) and 11(*b*), the digital data itself may be modified according to the accumulated lighting time a. In this case, a select signal is input to a selector 80*b* of a data correction circuit 80, and the selector 80*b* refers to an output correction table 80*a* and outputs a signal d to a digital-to-digital converter DDC 80*c* to define a central value based on which the digital data h is corrected by the DDC 80*c*. Digital data h' obtained by correction in the DDC 80*c* is input to the driver 50 for conversion into analog data e, and the analog data e is supplied to the organic EL panel.

In the examples shown in FIGS. 10(*a*)-11(*b*), of course, the drive voltage Voel or the digital data h can be adjusted or corrected based on the accumulated luminance, as described above in Exemplary Embodiments 2 and 3.

Although the present exemplary embodiment is applied to the reduction in brightness due to the degradation over time, a similar approach can be applied to an increase in brightness due to a change in temperature of the use environment.

In a case where there is no need for correction based on the accumulated lighting time from the shipping time of the product or the accumulated luminance, a volatile memory may be substituted for the non-volatile memory.

Also, a plurality of corrections may be performed in one-time use. In such a case, in the sequence shown in FIG. 2 or 5, a return process from S70 to S20 should be performed many times in a predetermined period.

The present invention is further applicable to an organic EL device in which light emitted from a common light source for R, G, and B is converted by color conversion layers for R, G, and B to obtain R, G, and B light. In this case, digital data for all R, G, and B may be measured by the RGB counter, or digital data for only one of the R, G, and B may be measured.

Figure 12:
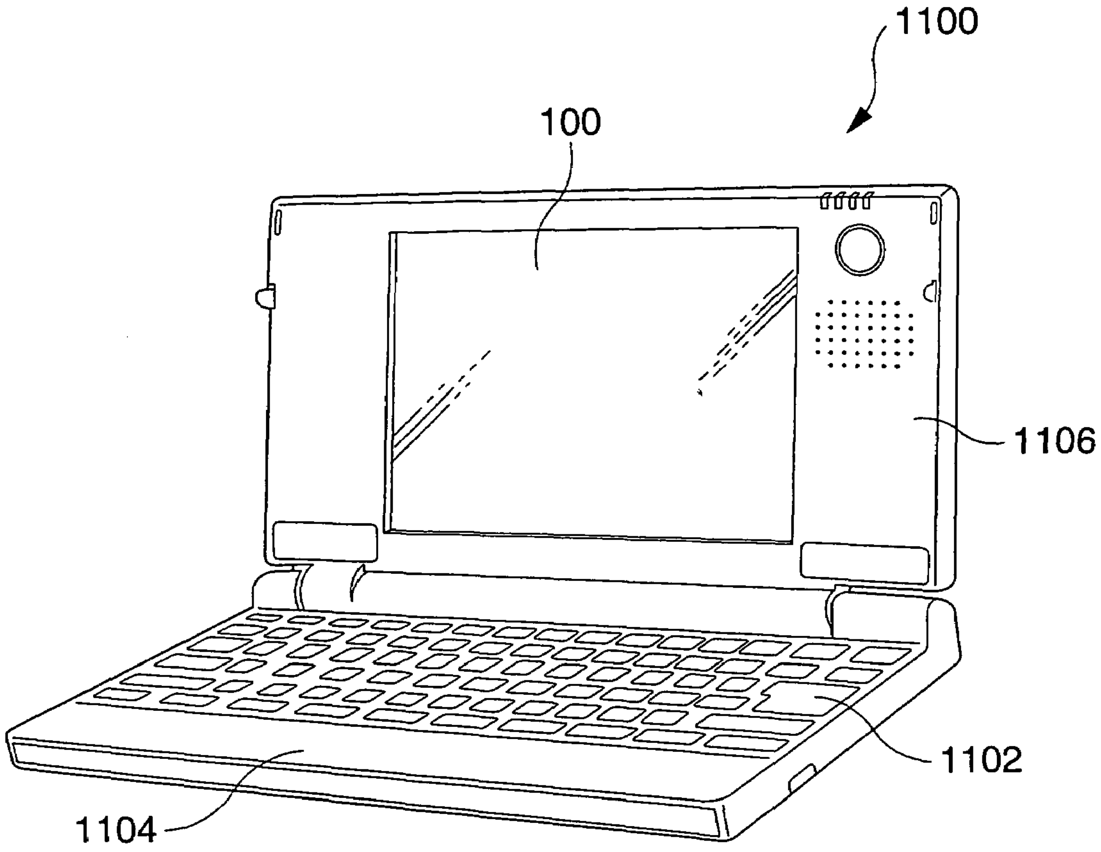
FIG. 12 is a schematic perspective view showing an example in which an electro-optical apparatus of the present invention is applied to a mobile personal computer.

Some specific examples of the above-described electronic apparatus in which an organic EL display apparatus is used for an electronic device are described below. First, an example in which the organic EL display unit according to this exemplary embodiment is applied to a mobile personal computer is described. FIG. 12 is a perspective view showing the structure of the mobile personal computer.

In FIG. 12, a personal computer 1100 includes a main body 1104 having a keyboard 1102, and a display unit 1106, and the display unit 1106 includes the above-described organic EL display apparatus.

Figure 13:
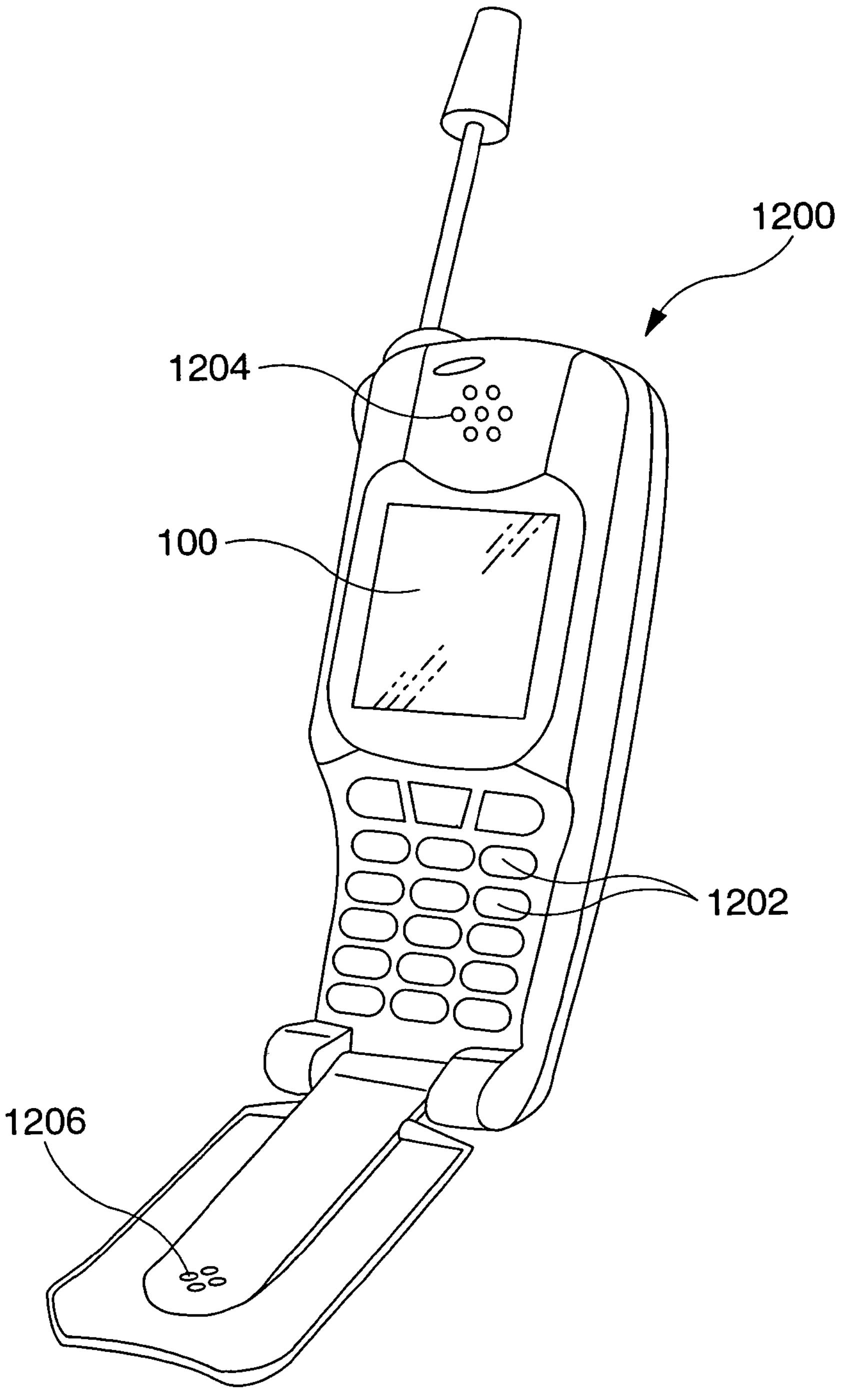
FIG. 13 is a schematic perspective view showing an example in which an electro-optical apparatus of the present invention is applied to a display unit of a cellular phone.

FIG. 13 is a perspective view showing the structure of a cellular phone whose display unit is implemented by the above-described organic EL display apparatus. In FIG. 13, a cellular phone 1200 includes a plurality of operation buttons 1202, an earpiece 1204, a mouthpiece 1206, and the above-described electro-optical apparatus 100.

Figure 14:
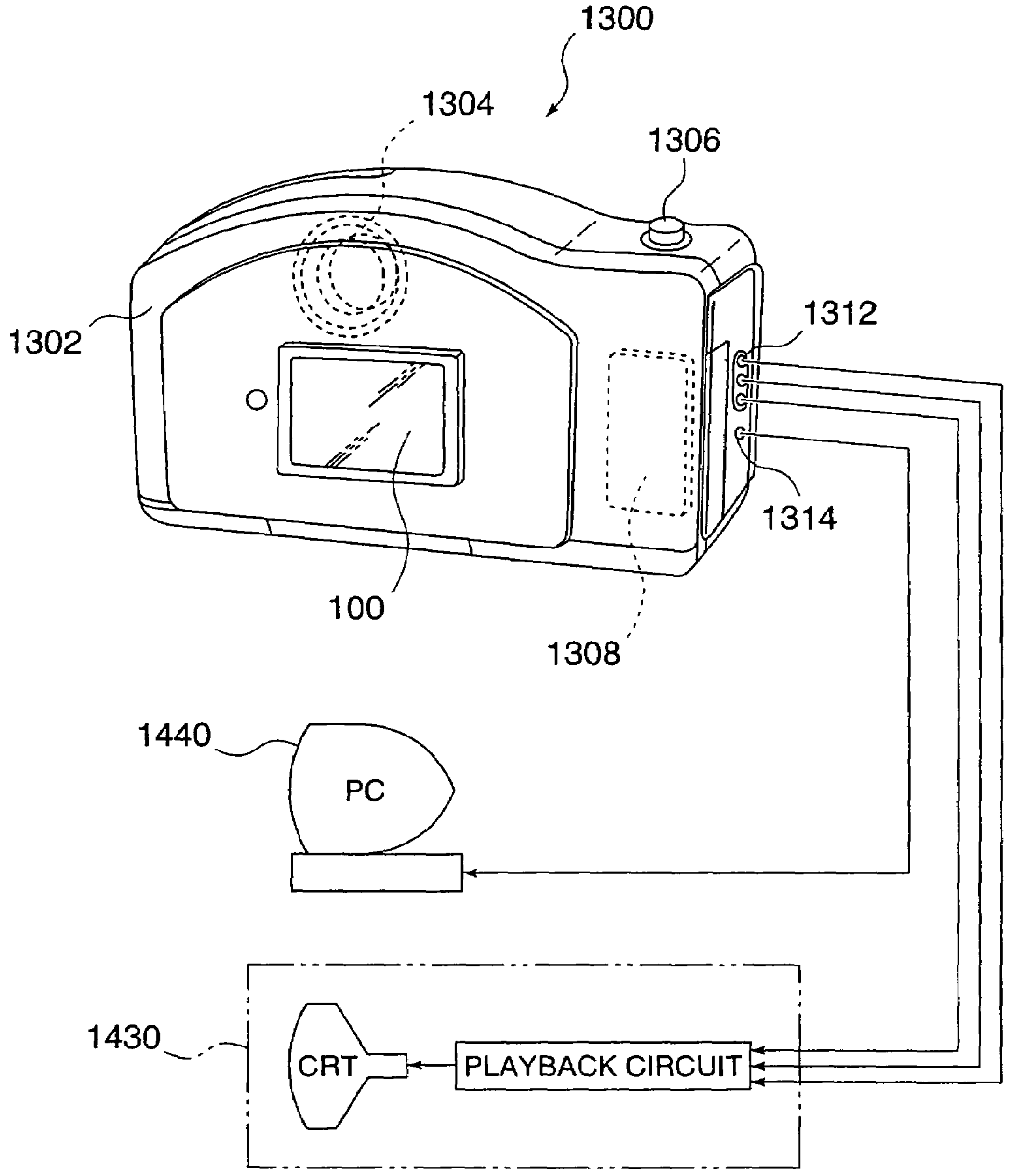
FIG. 14 is a schematic perspective view of a digital still camera having a finder that is implemented by an electro-optical apparatus of the present invention.

FIG. 14 is a perspective view showing the structure of a digital still camera whose finder is implemented by the above-described organic EL display apparatus 100. In FIG. 14, a connection with an external device is also illustrated in a simple manner. While a typical camera creates an optical image of an object to allow a film to be exposed, a digital still camera 1300 photoelectrically converts an optical image of an object using an imaging device such as a CCD (Charge Coupled Device) to generate an imaging signal. The above-described organic EL display apparatus is placed on a rear surface of a case 1302 of the digital still camera 1300 to perform display based on the imaging signal generated by the CCD, and the organic EL display apparatus functions as a finder for displaying the object. A light-receiving unit 1304 including an optical lens and the CCD is also placed on the viewing side of the case 1302 (in FIG. 14, the rear surface).

When a photographer views an image of an object displayed on the organic EL display apparatus and presses a shutter button 1306, the imaging signal of the CCD at this time is transferred and stored in a memory on a circuit board 1308. In the digital still camera 1300, a video signal output terminal 1312 and an input/output terminal 1314 for data communication are placed on a side surface of the case 1302. As shown in FIG. 14, a TV monitor 1430 is connected to the former video signal output terminal 1312, and a personal computer 1430 is connected to the latter input/output terminal 1314 for data communication, if necessary. The imaging signal stored in the memory on the circuit board 1308 is output by a predetermined operation to the TV monitor 1430 or the personal computer 1440.

Examples of electronic devices to which the organic EL display apparatus of the present invention is applicable include, in addition to the personal computer shown in FIG. 11, the cellular phone shown in FIG. 12, and the digital still camera shown in FIG. 13, a television set, a viewfinder-type or direct-view monitor type video tape recorder, a car navigation system, a pager, an electronic organizer, an electronic calculator, a word processor, a workstation, a videophone, a POS terminal, a touch-panel-equipped device, a smart robot, a lighting device having a light control function, and an electronic book, for example. The above-described organic EL display apparatus can be implemented as a display unit of such exemplary electronic devices.

The amount of drive current to be supplied to electro-optical devices is controlled, thus enabling a change in brightness to be compensated for.

What is claimed is:

1. An electro-optical apparatus comprising:

a plurality of scanning lines;

a plurality of signal lines;

a plurality of electro-optical devices placed at intersections of the plurality of scanning lines and the plurality of signal lines;

a driver to supply a drive voltage or a drive current to the electro-optical devices via the plurality of signal lines according to data signals;

a data signal measuring unit to measure an amount of data signals;

a data signal amount storage unit to accumulate and store the amount of the data signals; and a drive voltage control unit including a power supply circuit that supplies a power supply voltage to the electro-optical devices, the power supply voltage being adjusted based on the amount of the accumulated data signals stored in the data signal amount storage unit.

2. The electro-optical apparatus according to claim 1, the electro-optical devices including three types of electro-optical devices for R, G and B (red, green, and blue), the data signal measuring unit measuring the amount of the data signals for each of the three types of electro-optical devices, the data signal amount storage unit accumulating and storing the amount of data signals for each of the three types of electro-optical devices, and the power supply voltage being adjusted for each of the three types of electro-optical devices.

3. The electro-optical apparatus according to claim 1, the electro-optical devices including a first electro-optical device and a second electro-optical device, the data signal measuring unit measuring the amount of the data signals for each of the first electro-optical device and the second electro-optical device, the data signal amount storage unit accumulating and storing the amount of data signals for each of the first electro-optical device and the second electro-optical device, and the power supply voltage being adjusted for each of the first and the second electro-optical devices.

4. The electro-optical apparatus according to claim 1, the electro-optical devices including organic EL devices.

5. An electro-optical apparatus comprising:

a plurality of scanning lines;

a plurality of signal lines;

a plurality of electro-optical devices placed at intersections of the plurality of scanning lines and the plurality of signal lines;

a driver to supply a drive voltage or a drive current to the electro-optical devices via the plurality of signal lines according to data signals;

a lightning time measuring unit to measure an a lightning time of the plurality of electro optical devices;

a lightning time storage unit to accumulate and store the lightning time; and a drive voltage control unit including a power supply circuit that supplies a power supply voltage applied to the electro-optical devices, the power supply voltage being based on the accumulated lightning time stored in the lightning time storage unit.

6. The electro-optical apparatus according to claim 5, the lightning time measuring unit including a FCKL counter for counting a number of frame synchronizing signals.

* * * * *